United States Patent Office 2,833,224
Patented May 6, 1958

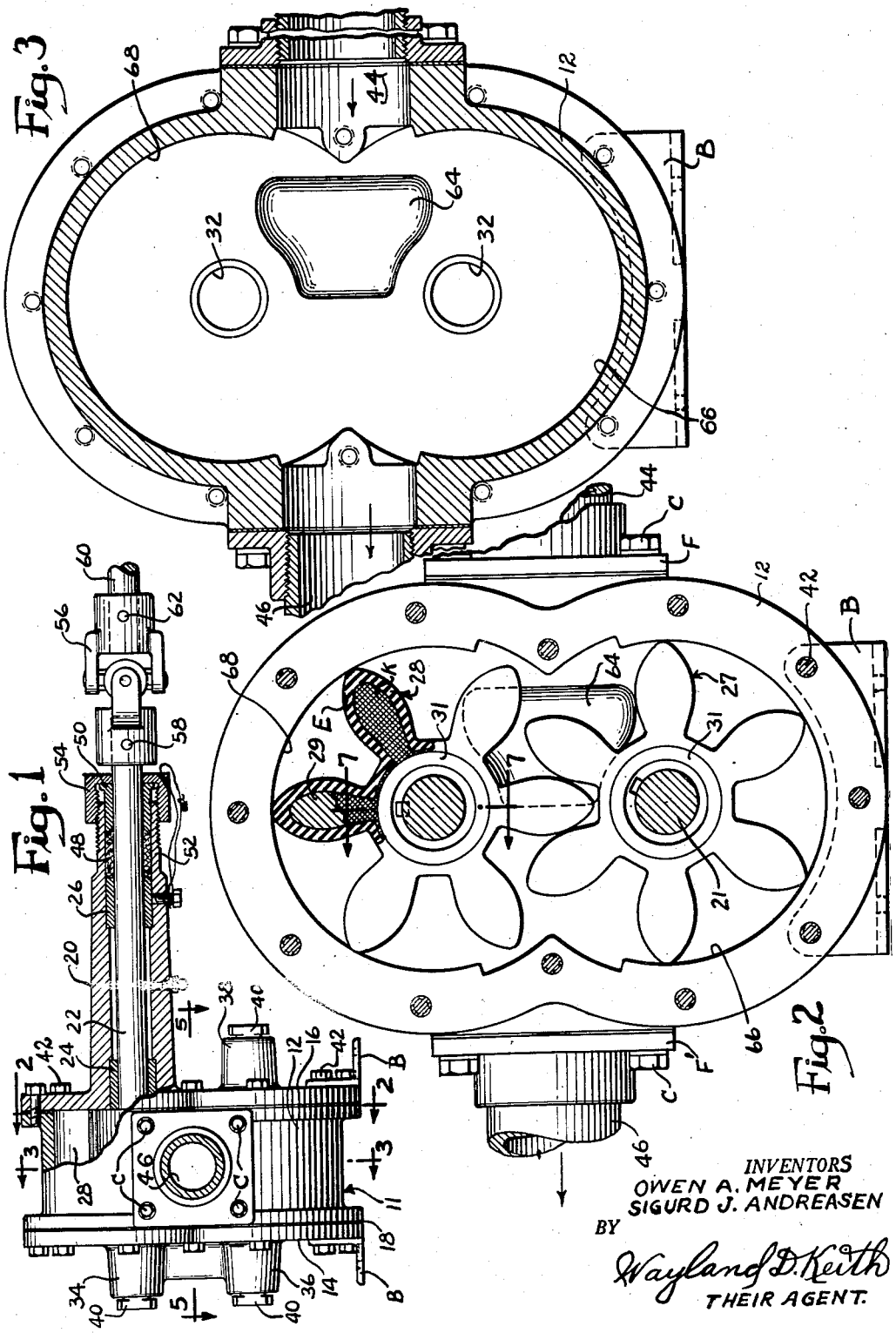

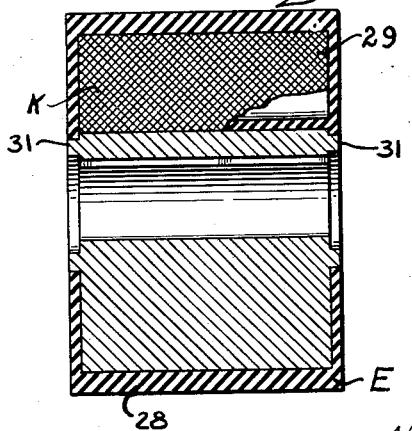
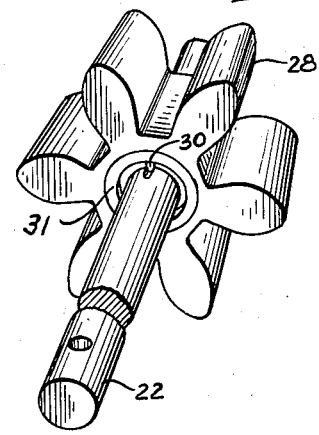
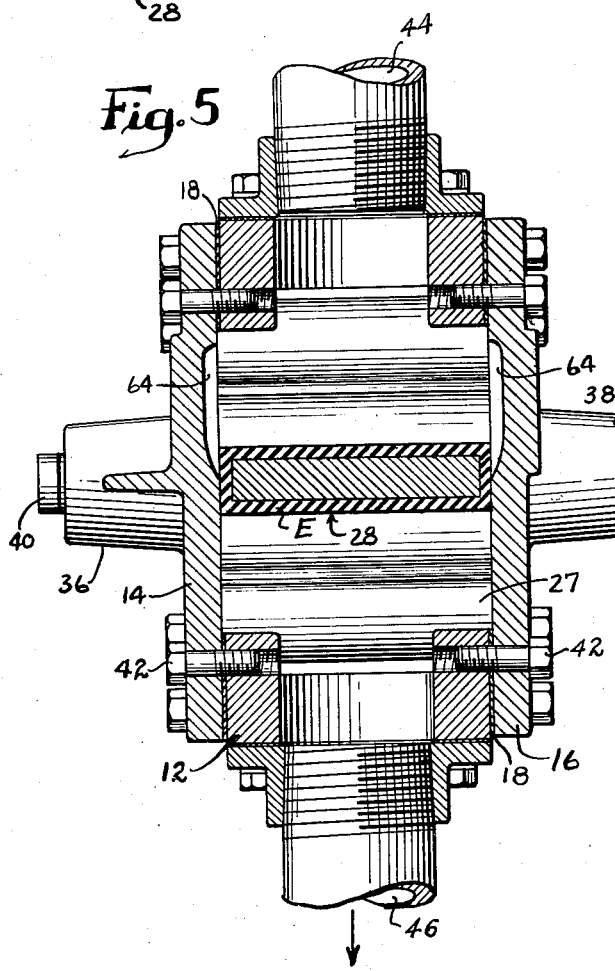
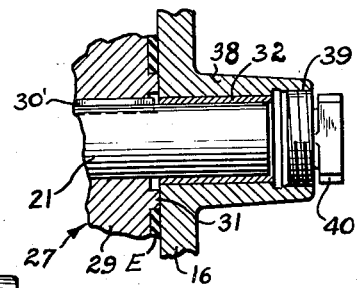
OWEN A. MEYER
SIGURD J. ANDREASEN
INVENTORS.

2,833,224

ROTARY PUMPS

Owen A. Meyer and Sigurd J. Andreasen, Bowie, Tex.

Application March 5, 1956, Serial No. 569,596

2 Claims. (Cl. 103—126)

This invention relates to improvements in a gear pump and more particularly to a gear pump wherein the gears thereof are covered with an elastomer material such as rubber, synthetic rubber, elastic plastic, or the like.

Various gear pumps have been proposed heretofore, but these for the most part, had gears of a metallic construction, and the fluid pumped had to be ideally clean to insure an average life to the various elements thereof. Furthermore, after the gears became even slightly worn, the pumping efficiency decreased rapidly.

In the present invention, the gear elements are covered on all faces and over the greater portion of the ends, with an elastomer material, which material is in wiping contact with a finished metal surface, so as to impel the fluid being pumped therealong with great efficiency. The gears of the present device are so made as to interengage on a pitch line so that the elastomer material will be slightly compressed when the gears are in engagement, and furthermore, the addendum of the gear teeth are such as to be slightly compressed in wiping contact with the inner surface of the arcuate bores of the pump housing, with the contact surface being greater than 180 degrees for each gear. With the gears and gear housing being constructed in this manner, the fluid being pumped is drawn in at the inlet and discharged at the outlet with a high degree of efficiency.

An object of this invention is to provide a gear pump of high efficiency, which will pump fluids containing impurities, some of which may be solids, with a minimum of wear on the gears and gear housing.

Another object of this invention is to provide a gear pump of high efficiency, wherein the surface of the gears is covered with an elastomer material, which material is resistant to abrasive wear.

Still another object of the invention is to provide a gear pump wherein a metallic gear spider is covered with a coating of elastomer material which is bonded thereto as by vulcanizing or the like.

A further object of the invention is to provide a gear pump wherein the centers of the shafts of the respective gears are in aligned relation with threaded sockets in the gear housing so as to enable piloting the machine elements to insure accurate machining and refinishing of the gear housing and the bores for the shaft bushings.

Yet another object of the invention is to provide a main drive shaft support arm on the gear housing, wherein said drive shaft support arm is bushed near each end thereof, and forms a lubricant reservoir intermediate said bushings.

A still further object of the invention is to provide a gear pump housing wherein the drive shaft thereof is supported in bushings within the length of an arm, and a stuffing box gland is provided which is positioned at the outer end of the support arm in such manner as to encompass and seal the drive shaft against leakage of lubricant.

With these objects in mind, and others which will become manifest as the description proceeds, reference is to be had to the accompanying drawings, in which like reference characters designate like parts in the several views thereof, in which:

Fig. 1 is a side elevational view of a gear pump with parts broken away and with parts shown in section to bring out the details of construction, and showing a universal joint attached to the outer end of the pump drive shaft;

Fig. 2 is a sectional view taken on the line 2—2 of Fig. 1, looking in the direction indicated by the arrows, with a fragmentary portion of one of the gears having the elastomer covering thereof broken away to show the details of construction;

Fig. 3 is a view similar to Fig. 2, taken on the line 3—3 of Fig. 1, looking in the direction indicated by the arrows, but with the gears thereof removed from the gear housing to show the details of construction of the gear housing;

Fig. 4 is a longitudinal sectional view through the gear removed from the pump, showing the elastomer covering thereon, and showing a portion of the gear with the elastomer covering removed from the surface of the metallic, toothed spider, showing the roughened or knurled surface in full outline, and showing a portion of the gear and covering thereof in section;

Fig. 5 is a sectional view taken on the line 5—5 of Fig. 1, looking in the direction indicated by the arrows;

Fig. 6 is a perspective view of one of the rubber-covered gears removed from the pump but shown attached to the drive shaft thereof, with portions of the shaft being broken away and shortened and with parts shown in section to bring out the details of construction; and Fig. 7 is an enlarged fragmentary, sectional view of a portion of the gear housing and gear, showing a threaded shaft pilot socket in the housing with a bushing fitted therein.

With more detailed reference to the drawing, the numeral 11 designates generally a gear pump housing which has a gear housing body portion 12 and end plate members 14 and 16. A gasket 18 is interposed between the housing 12 and the respective end plates 14 and 16, so as to form a tight seal therebetween. The end plate 16 has an outstanding arm 20 thereon to receive a drive shaft 22 therethrough, which drive shaft is journalled in bushings 24 and 26 in the outstanding arm 20, as will be seen in Fig. 1. A gear 28 is secured to drive shaft 22, as by a key 30, which key interengages the shaft 22 and the gear 28, as will best be seen in Fig. 2. A bushing 32 is fitted in aligned relation in end plate 14 with bushings 24 and 26, so as to journal an end of the shaft 22 therein in a manner as shown in Figs. 3 and 7. The end plate 14 has bosses 34 and 36 and the end plate 16 has a boss 38 thereon, together with outstanding arm 20. Each of the bosses have a socket or bore formed therein to receive bushings 32 respectively, such as indicated in Fig. 7.

The outer ends of these sockets are threaded at 39 to threadably receive the respective plugs 40, as will best be seen in Fig. 8, which also enables the screwing of a guide member into place, to enable accurate machining of the bores of the sockets and the bores of the gear housing body 12. These threaded sockets also provide a pilot to enable the re-machining of the parts, so as to compensate for wear, in such manner as to lessen the set-up time when the pump is re-worked.

The end plates 14 and 16 are held in secure relation to the pump housing 12 by means of cap screws 42. A base B may be secured to a side of the pump, as indicated in Fig. 1, by cap screws 42. While the pump is shown mounted in a particular position, it is to be understood that the pump will run while in any position, simply by shifting the base B. The pump is provided with an inlet pipe 44 and with an outlet pipe 46. The inlet is so formed as to direct the fluid into the gears so that the fluid being pumped will be carried around the gears in the peripherial pockets formed between the teeth of the respective gears so as to discharge the fluid from the outlet side of the pump, with the fluid carried being wholly entrapped in a sealed compartment formed by the rubber or elastomer material E which forms a facing or covering for the gears.

The drive and driven gears 28 and 27, respectively, are substantially identical, and each has a spider 29 therein which is of less diameter than the finished gear, and also of less length. The greater surface of the respective spiders are roughened, as by sand blasting or knurling, or the like, to provide a bonding surface for the elastomer material, so when the elastomer material is vulcanized or bonded to the metallic spider, in a mold with the spider thereof aligned centrally of the cavity of the mold (not shown) by the bore of the spider being in register with central pilot means in the mold, so as to hold the metallic gear spider 29 with the faces and ends of the teeth a spaced distance from the wall of the mold cavity, so as to allow the forming of the elastomer material into involute gear teeth, when the spider 29 is clamped securely against annular rings 31, one on each end of the spider. The elastomer material E is then filled into the void of the mold and will surround and become bonded to, to a predetermined thickness, the respective faces and ends of the gear teeth and to the body of the gear spider, except for that portion thereof which is occupied by the annular rings 31, which end surfaces of annular rings 31 will form guides to determine the length of the finished gear, so when the elastomer material is thoroughly cured, as by vulcanizing or the like, and removed from the mold, the coating thereof on the ends of the body of the gear spider will be substantially flush with the ends of the annular rings 31, positioned on either end of the gear spider. The respective rings 31 may be plated with chrome or other hard surfacing material and then ground to a fine finish to form a complementary bearing surface to be in bearing relation with the respective end plates 14 and 16.

The plugs 40 seal the sockets at each end of the driven shaft 21, on which driven gear shaft 27 is secured. A plug 40 also seals socket 34 at one end of the drive shaft 22. A packing 48 is provided intermediate bushing 26 and gland 50 in the outer end of outstanding arm 20, to form a seal within stuffing box 52 of outstanding arm 20. A packing gland nut 54 threadably engages the arm 20 at the outer end thereof, which nut 54 surrounds shaft 22 so as to enable the tightening of gland 50 to form a fluid tight seal with the shaft 22.

A universal joint 56 is shown connected to an end of drive shaft 22, as by a pin 58, which universal joint 56 is connected to shaft 60 by means of a pin 62. The shaft 60 may be connected to any suitable source of power drive, in a manner well understood in the art.

A recess 64 is provided within each of the end plates 14 and 16, adjacent the inlet opening so as to increase the volume of fluid at this point, when the fluid is being directed through the pump in the manner indicated by the arrow, however, the pump will operate with a fair degree of efficiency with the gears turning in the opposite direction to direct the fluid outward in the reverse direction, to that indicated by the arrows. In this manner, the pump may be used, both to fill tanks and to discharge fluid from tanks, merely by reversing the direction in which the gears are rotating.

It is to be pointed out that the metallic gear spiders 29 of each of the gears 27 and 28 of the gear pump, is of the general gear tooth form, and the elastomer coating E, on the faces and ends of the gear teeth and on the gear body, is of such thickness and of such resiliency as to permit the embedding of foreign particles within the elastomer material E, when the faces of the gears 27 and 28 come into contact relation. However, the embedding of the foreign particles in the elastomer material E does not cut the surface, and when the gear faces roll out of contact, the foreign particles are readily washed away, with no damaging result to the facing of elastomer material E, which is bonded to the gear spider 29.

An annular metallic facing 31 is provided on each end of each gear spider 29, to be in contact relation with the respective end plates 14 and 16, so as to prevent undue drag on the elastomer end facings E of the respective gears. The contact surfaces of annular rings 31 and the adjacent faces of end plates 14 and 16 may be especially treated, as by the application of hard chrome or other hard surfacing material, so as to minimize wear between the parts.

While the faces and ends of the gear teeth and the body of the spiders 29 have been shown and described as being roughened or knurled, it is to be understood that by treating the spiders in this manner, a higher degree of bonding may be obtained between the elastomer material and the metal of the spider 29. However, it is also to be understood that the bonding of the rubber or other elastomer material E to a smooth surface on the spider may be practiced. The important factor in the present elastomer covering for the gears and body of the spider, is the bonding of the elastomer material to the metal of the spider.

The flanges F and F' are attachably connected to the housing 11 by means of cap screws C, so when the inlet and outlet lines 44 and 46, respectively, are connected to the respective flanges F and F', the pump will be held in secure relation therebetween. However, the pump may be readily removed and replaced by removing cap screws C, which will enable the removal of the pump for repair and the replacement thereof, without the necessity of using unions or of disconnecting other portions of the pipe line. The pump may also be mounted on a suitable mounting by cap screws C.

*Operation*

The gear pump housing 11 is more or less of the conventional type, and has gears 27 and 28 mounted on the respective shafts 21 and 22. The shaft 21 is journaled in bushings 32 fitted within end plates 14 and 16, and the shaft 22 is journaled on bushings 24, 26 and 32. The bushings are spaced apart so that the shafts 21 and 22 maintain the gears 27 and 28 in spaced relation so there will be a slight compression between the adjacent contact faces of the gear teeth and between the ends of the gear teeth and the housing, which insures a tight seal to perform the maximum efficiency of pumping operation. The fluid being pumped is normally drawn in through inlet pipe 44 and is discharged through outlet pipe 46, with each of the addendum of the gear teeth having intimate contact with their respective bores 66 and 68. The bores 66 and 68 are each of greater arcuate distance than 180 degrees. In this manner leakage is minimized; therefore the efficiency of the pump is greatly increased.

While the invention has been described and illustrated in a single embodiment thereof, it is to be understood that changes may be made in the minor details of construction, and adaptations made to different installations, without departing from the spirit of the invention or the scope of the appended claims.

Having thus clearly shown and described the invention what is claimed as new and desired to secure by Letters Patent is:

1. In a housing for a gear pump utilizing a pair of gears, each of which gears is mounted on a shaft, and which gears are adapted to run in meshed relation; an end plate on each end of said housing, a pair of bosses extending outwardly in aligned relation from each of said end plates, each of said bosses having a bore formed therethrough, opposed pairs of said bores being in axial alignment, the axes of which bores are spaced apart transversely the pitch diameter of one of said gears, each pair of opposed bores being adapted to receive one of said shafts, one of said bosses of one pair of bosses extending outwardly a substantially greater distance than the other of said bosses, a counter bore formed in one of said end plates and extending into said boss which extends outward a greater distance than the other of said bosses, a counter bore in the outer end of said last mentioned boss, a sleeve bearing fitted in each of said counter bores of said last mentioned boss so said bearings will be spaced apart longitudinally, which sleeve bearings support one of said shafts in close fitting, bearing relation therein, said last mentioned boss and said last mentioned shaft forming an annular opening between said sleeve bearings, a passage formed in said last mentioned boss and connected with said annular opening, a lubricant fitting within the passage of said boss, a packing positioned around said shaft outward of said outer sleeve bearing within said outer counter bore in said boss, said packing being in contact relation with said bearing, a gland within said outermost counterbore, said outwardly extending boss being threaded at its outer end; apertured, threaded means adapted to surround said shaft and to threadably engage said boss and be in contact relation with said gland, and set screw means screw threaded into said boss for securing said outer bearing against relative movement with respect to said boss.

2. The device as set forth in claim 1; wherein each of said gears have the teeth thereof completely covered with rubber like material to form involute teeth.

References Cited in the file of this patent

UNITED STATES PATENTS

| | | |
|---|---|---|
| 60,366 | Hardy et al. | Dec. 11, 1866 |
| 638,853 | Snyder | Dec. 12, 1899 |
| 698,539 | McBride | Apr. 29, 1902 |
| 1,103,053 | Kiefer | July 14, 1914 |
| 2,383,194 | Hoopes | Aug. 21, 1945 |
| 2,407,753 | Wallgren | Sept. 17, 1946 |
| 2,530,767 | Hamill | Nov. 21, 1950 |
| 2,567,699 | Devlin | Sept. 11, 1951 |
| 2,697,402 | Lindquist | Dec. 21, 1954 |